Oct. 15, 1968 C. G. CONNOLLY 3,405,973
SAFETY BELT
Filed Nov. 2, 1966 2 Sheets-Sheet 1
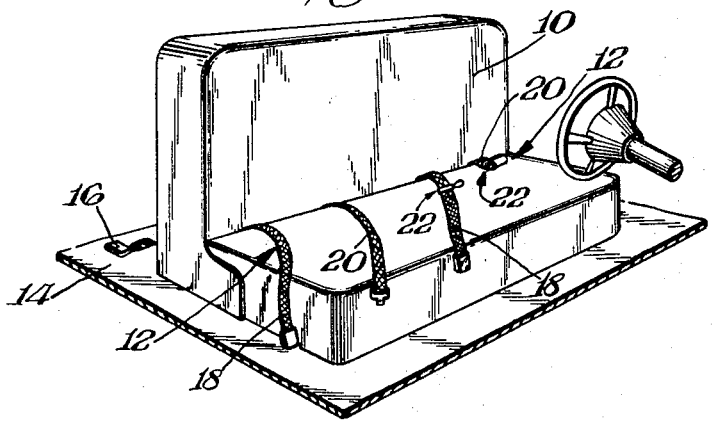
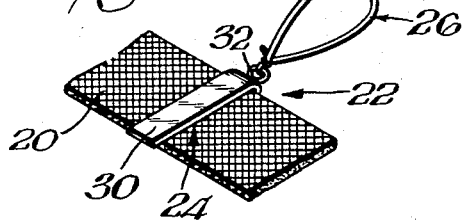
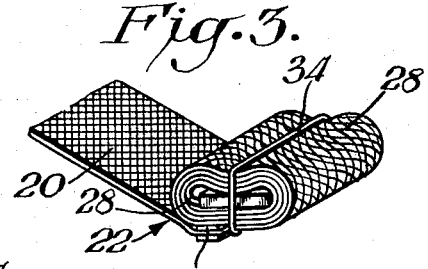
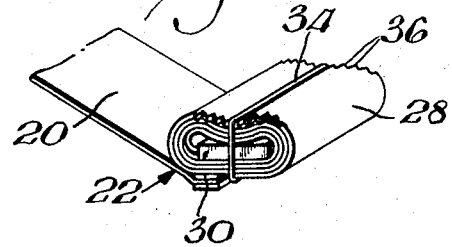
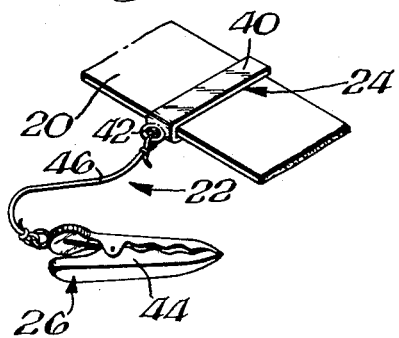
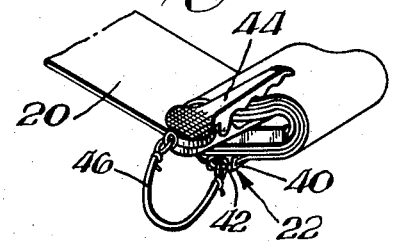

Oct. 15, 1968   C. G. CONNOLLY   3,405,973
SAFETY BELT
Filed Nov. 2, 1966   2 Sheets-Sheet 2
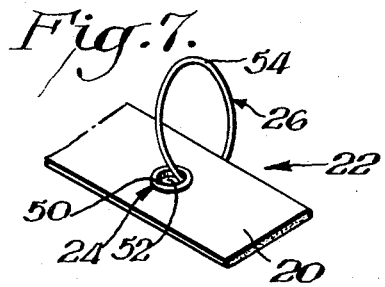
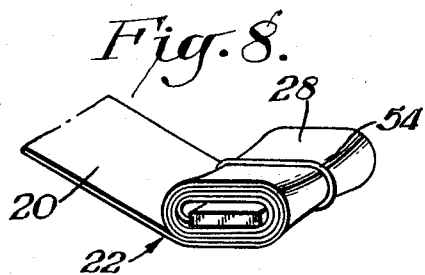
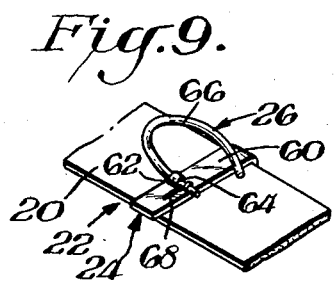
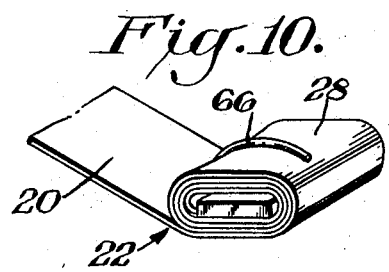
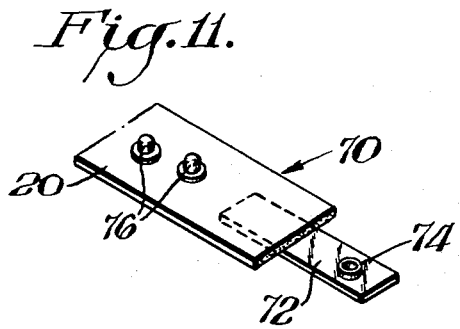
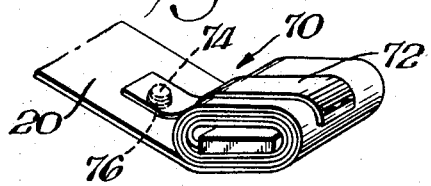
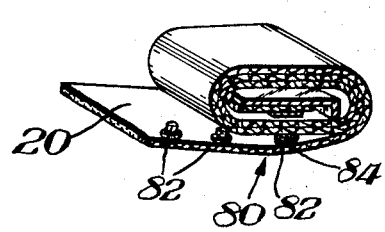

United States Patent Office 3,405,973
Patented Oct. 15, 1968

3,405,973
SAFETY BELT
Christopher G. Connolly, 102 School Road, Alapocas,
Wilmington, Del. 19803
Filed Nov. 2, 1966, Ser. No. 591,498
12 Claims. (Cl. 297—385)

ABSTRACT OF THE DISCLOSURE

A safety belt construction for vehicles comprising nonretractile buckle carrying and strap members arranged for releasable locking engagement with each other, and an assembly for storing at least one of the safety belt members in a compact nonuse position, the assembly including fastening structure for securing it to one of the safety belt members and retainer structure for engaging a manually wound portion of one of the safety belt members to hold that member in a compact nonuse position when it is manually coiled.

The present invention relates to safety belts and more particularly to a safety belt construction having an assembly for storing the belt in a compact position.

Prior to the present invention numerous safety belts have been proposed for use in both land and air vehicles. Although the benefit of safety belts has long been recognized total acceptance by the general public is far from a reality. The inconvenience of safety belt use together with the frequent malfunction of the most common belt retractors has turned the public away from using safety belts even though most people are aware of the benefits derived from using such belts.

When most safety belts are not in use they simply lie loosely on the seat of the vehicle or on the vehicle floor adjacent the seat. Often, the occupant of the vehicle must first locate the hidden belt before it can be locked in place. The buckle half of the safety belt frequently becomes tangled in the framework of the seat and has a tendency to damage the seat upholstery. Moreover, the safety belt portions adjacent the ends of the seat structure are sometimes pushed out of the vehicle by the occupants and those belt portions damaged by closing the vehicle doors on them. Not only are the safety belts damaged but the vehicle doors are often forced out of line.

Safety belt manufacturers have long sought a simple, inexpensive and convenient arrangement for storing each half of a safety belt in an out-of-the-way position when not in use. Although devices have been proposed that purportedly perform this function, in particular safety belt retractors, these arrangements are marked by their cumbersome and complex nature which renders them unsuitable from both operational and economical standpoints. Additionally, in most instances the heretofore available devices can only be used to maintain one-half of the safety belt in a nonuse position thus leaving the remaining half of the belt free to cause damage to the vehicle and inconvenience to the occupant.

Accordingly, it is an object of the present invention to provide a safety belt construction having a simple, economical and easy-to-use assembly for storing at least one of the safety belt halves in a compact nonuse position.

Another object of the present invention is to provide a safety belt construction having an assembly for storing at least one of the safety belt halves in a compact nonuse position, the assembly being easy to install on existing safety belts.

In accordance with the present invention a vehicle safety belt construction is provided having a nonretractile buckle carrying member and a nonretractile strap member arranged for releasable locking engagement with the buckle member. The safety belt also has an assembly for storing at least one of the safety belt members in a compact nonuse position. The assembly includes fastening structure for securing it to one of the safety belt members, and a belt retainer for engaging a manually wound portion of one of the safety belt members to hold that member in a compact nonuse position when it is manually coiled.

The belt retainer of the assembly may be a loop of resilient material which is simply slipped around the manually wound portion of the safety belt member when belt storage is desired. Alternatively, a spring biased clamp that engages the wound portion of the belt or a resilient U-shaped clamping element fixed to the belt can be utilized to hold the wound portion of the belt in a compact position. Further, the belt retainer may be a strap of flexible material attached to one side of the safety belt member, the strap being wrapped around the wound portion of the belt and locked in place to hold the belt in a compact stored position. A snap fastener can also be provided on one side of the belt member that locks into a complementary lug on the other side of the belt member when storage of the belt in a compact position is desired.

Novel features and advantages of the present invention will become apparent to one skilled in the art from a reading of the following detailed description in conjunction with the accompanying drawings wherein similar reference characters refer to similar parts and in which:

FIGURE 1 is a pictorial view of a safety belt construction according to the present invention;

FIGURES 2 and 3 are isometric perspective views of the safety belt construction of FIGURE 1;

FIGURE 4 is an isometric perspective view of a safety belt construction similar to the construction shown in FIGURES 1–3;

FIGURES 5 and 6 are isometric perspective views of another embodiment of the present invention;

FIGURES 7 and 8 are isometric perspective views of still another embodiment of the present invention;

FIGURES 9 and 10 are isometric perspective views of another embodiment of the present invention;

FIGURES 11 and 12 are isometric perspective views of another embodiment of the present invention; and FIGURE 13 is an isometric perspective view in section of still another embodiment of the present invention.

Referring in more particularity to the drawings, FIGURE 1 shows a vehicle seat 10 and two sets of safety belts 12, one on each side of the seat. Each safety belt is anchored to the framework 14 of the vehicle, as shown for example at 16, and each set has a nonretractile flexible buckle carrying member 18 and a nonretractile flexible strap member 20. As is well known, the occupant of the vehicle simply wraps each belt half around his body and then locks the halves together to thus anchor himself to the framework of the vehicle. The right-hand safety belt construction 12, as viewed in FIGURE 1, has an assembly 22 on each belt member for storing the members in a compact nonuse position. Additional assemblies 22 may also be provided for the left-hand safety belt, if desired. Although FIGURE 1 illustrates an assembly 22 for each member of the right-hand safety belt, a single assembly may be provided for only one of the members.

Each assembly 22 includes fastening structure 24 for securing the assembly to a safety belt member, such as the strap member 20, for example. Additionally, the assembly 22 includes a belt retainer 26 that engages a manually wound portion 28 of the belt member to hold that member in a stored compact position when it is manually coiled, as explained more fully below.

In the embodiment of the present invention illustrated in FIGURES 1–3, the fastening structure 24 comprises an integral spring clip 30 which may be constructed of steel, plastic, or similar spring-like materials. The clip 30 has a U-shaped configuration and is secured to the safety belt member 20 by moving the opposed legs of the clip away from each other and then inserting the belt member between the legs. The clip is then released so that the legs can spring back together and thus clamp onto the belt member. The spring clip 30 also has an opening or eyelet 32 at its closed end for holding the belt retainer 26. As shown in FIGURES 1–3 the belt retainer comprises a loop 34 constructed of resilient material such as rubber, for example. The loop extends through the opening 32 in the spring clip 30 and is thus held at a predetermined position on the safety belt member 20 which position is determined by the location of the spring clip.

In operation, the assembly 22 of FIGURES 1–3 functions to store the safety belt member 20 in a compact nonuse position. The free end of the member is simply manually coiled until the wound portion 28 is adjacent the assembly. Next, the resilient loop 34 is slipped around the wound portion 28 to hold that portion in a compact wound position. Thus, the safety belt member 20 is positioned in an out-of-the-way location on the vehicle seat 10 where it can remain until the safety belt is again used. Since most vehicles have a safety belt construction for each occupant it is not necessary to release the safety belt members from their stored positions until a vehicle passenger occupies the seat portion for which a particular safety belt is provided.

As shown in FIGURE 4, the safety belt member 20 may be provided with opposed serrated edge portions 36 for preventing the resilient loop 34 from slipping off of the wound portion 28 of the belt member. The loop 34 engages the wound portion 28 of the belt member 20 in the same manner as described above, and the serrations positively lock the loop in place on the wound portion of the belt member.

FIGURES 5 and 6 illustrate another embodiment of the present invention wherein the assembly 22 includes fastening structure in the form of a spring clip 40 similar in design to the above described clip 30. Clip 40 has an opening 42 and can be clamped to the safety belt member 20 in the same manner as described above in conjunction with the operation of clip 30. The assembly 22 of FIGURES 5 and 6 also includes a belt retainer which may take the form of a spring biased clamp 44. The clamp 44 has a cord 46 that serves to secure the clamp to the fastening structure of the assembly.

In operation, the spring biased clamp is urged to an open position against the force of a hairpin spring disposed between the fingers of the clamp. Next, the clamp 44 is fixed to the wound portion 28 of the safety belt member 20, as shown in FIGURE 6, and then released to thereby hold the member in a stored compact position.

Turning now to FIGURES 7 and 8, another embodiment of the present invention is illustrated wherein the fastening structure 24 of the assembly 22 comprises a grommet 50 secured to an aperture 52 in the safety belt member 20 at a predetermined position remote from the free end of the belt member. In this embodiment a loop 54 of resilient material similar in design to the above described loop 34 operates to hold the portion 28 of the safety belt member 20 in a compact nonuse position. The resilient loop 54 is simply wrapped around the wound portion 28 after the belt member 20 is manually coiled. As shown in FIGURE 8, in the belt engaging position, the resilient loop 54 is disposed in a plane normal to the longitudinal axis of the wound portion, unlike the embodiments of FIGURES 1–4 wherein the resilient loop is disposed in a plane parallel to the longitudinal axis of the wound portion.

In the embodiment of the invention shown in FIGURES 9 and 10 the fastening structure 24 of the assembly 22 comprises a U-shaped clip 60 which is clamped to the safety belt member 20 at a predetermined location spaced from the free end of the belt member. The clip 60 can be constructed of thermoplastic material and molded so that a boss 62 is provided on one of the exterior faces of the clip. The boss 62 may have a suitable internal passageway 64 to facilitate connection of the belt retainer 26 to the clip 60 and thus to the belt member 20. The belt retainer can take the form of a substantially U-shaped clamping element 66 with an end portion disposed in the internal passageway of the boss 62. A torsion spring 68 is provided on the U-shaped clamping element 66 for urging the element flatly against the clip 60 when the safety belt is in use. This prevents the element from catching on the seat upholstery and the clothing of the occupants. When safety belt storage is desired the member 20 is manually coiled from its free end back toward the assembly 22 until the wound portion is adjacent the assembly. Thereafter, the wound portion is fitted into the U-shaped clamping element 66 and this element holds the wound portion of the belt in a neat compact position until use of the belt is again desired.

FIGURES 11 and 12 illustrate still another embodiment of the present invention wherein a belt retainer arrangement 70 comprises a flexible strap 72 fixed to one side of the safety belt member 20 at a predetermined position remote from the free end of the member. The strap may be adhesively fastened to the safety belt member 20 or attached thereto by a sewing operation, for example. A locking button 74 is provided at the free end of the strap 72 and this button cooperates with a series of locking lugs 76 fastened to the other side of the safety belt member 20. In operation, the safety belt member 20 is first manually coiled, as shown in FIGURE 12, and then the locking button 74 on the strap 72 is snapped onto one of the lugs 76 to thereby hold the safety belt member 20 in a wound compact out-of-the-way position.

FIGURE 13 illustrates another embodiment of the instant invention wherein a belt retainer arrangement 80 comprises a series of locking lugs 82 on one side of the safety belt member 20 at spaced intervals remote from the free end of the member. The belt retainer arrangement 80 also comprises a locking button 84 on the side of the belt member opposite the locking lugs. When storage of the belt member 20 is desired the member is manually wound from the free end toward the belt retaining arrangement. The locking button then engages one of the locking lugs and is force fitted onto the lug to thereby hold the safety belt member 20 in a compact position.

What is claimed is:

1. In a safety belt construction for vehicles comprising a nonretractile buckle carrying member and a nonretractile strap member arranged for releasable locking engagement with the buckle member, the improvement comprising an assembly for storing at least one of the safety belt members in a compact nonuse position, the assembly including fastening means for securing it to one of the safety belt members and retainer means for engaging a manually wound portion of one of the safety belt members to hold that member in a compact nonuse position when it is manually coiled.

2. The combination of claim 1 in which the retainer means comprises a loop of resilient material.

3. The combination of claim 2 in which the wound portion of the safety belt member has a longitudinal axis and the resilient loop is disposed in a plane normal to the axis when the loop engages the wound portion to hold the safety belt member in a compact nonuse position.

4. The combination of claim 2 in which the safety belt member to which the assembly is fastened has opposed serrated edge portions and the resilient loop fits into the serrations on the belt member when the loop engages the belt member to hold it in a compact nonuse position.

5. The combination of claim 2 in which the fastening means comprises an integral spring clip.

6. The combination of claim 2 in which the fastening means comprises a grommet and the resilient loop extends through the grommet.

7. The combination of claim 1 in which the retainer means comprises a spring biased clamp.

8. The combination of claim 1 in which the retainer means comprises a resilient U-shaped clamping element having an open end which faces the free end of the safety belt member to which the assembly is fastened.

9. The combination of claim 8 in which the U-shaped clamping element is disposed in a plane normal to the plane of the safety belt member when the element engages the manually wound portion of the belt, and biasing means connected between the U-shaped clamping element and the fastening means for urging the element flatly against the fastening means when the safety belt is in use.

10. In a safety belt construction for vehicles comprising a nonretractile buckle carrying member and a nonretractile strap member arranged for releasable locking engagement with the buckle member, the improvement comprising a belt retainer arrangement for storing at least one of the safety belt members in a compact nonuse position, the retainer arrangement including a locking lug on one side of the member, and a locking button connected to the other side of the member arranged to snap over the locking lug when the safety belt member is manually coiled.

11. The combination of claim 10 in which the belt retainer arrangement includes a series of locking lugs arranged at spaced intervals on one side of the safety belt member, and the locking button connected to the other side of the member snaps over any one of the locking lugs to hold the member in a compact nonuse position when it is manually coiled.

12. The combination of claim 10 in which the locking button is secured to one side of the safety belt member by a flexible strap.

References Cited

UNITED STATES PATENTS

| | | | |
|---|---|---|---|
| 1,570,451 | 1/1926 | Simoneau | 24—81 |
| 2,397,087 | 3/1946 | Camras | 206—53 |
| 2,723,431 | 11/1955 | Di Renzo | 24—16 X |
| 3,206,813 | 9/1965 | Schumm. | |
| 3,247,558 | 4/1966 | Kaufman | 206—55 X |
| 3,275,969 | 9/1966 | Sheeran | 24—129.2 |
| 3,312,420 | 5/1967 | Boedigheimer | 297—388 X |
| 3,321,245 | 5/1967 | Christen | 297—388 |

FOREIGN PATENTS

| | | |
|---|---|---|
| 21,142 | 8/1905 | Austria. |
| 13,763 | 1887 | Great Britain. |

JAMES T. McCALL, *Primary Examiner.*